(12) United States Patent
Park

(10) Patent No.: US 12,703,246 B2
(45) Date of Patent: Aug. 11, 2026

(54) POWERTRAIN CONTROL SYSTEM AND METHOD OF VTOL AERIAL VEHICLE

(71) Applicants: Hyundai Motor Company, Seoul (KR); Kia Corporation, Seoul (KR)

(72) Inventor: Seong Ik Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/397,175

(22) Filed: Dec. 27, 2023

(65) Prior Publication Data

US 2024/0183316 A1 Jun. 6, 2024

Related U.S. Application Data

(62) Division of application No. 17/509,694, filed on Oct. 25, 2021, now Pat. No. 11,891,960.

(30) Foreign Application Priority Data

Feb. 2, 2021 (KR) ........................ 10-2021-0014484

(51) Int. Cl.

*B64C 29/00* (2006.01)
*B60L 3/00* (2019.01)
*B64D 27/33* (2024.01)
*B64D 27/357* (2024.01)
*B64D 31/06* (2006.01)
*B64D 31/18* (2024.01)

(Continued)

(52) U.S. Cl.

CPC ............ *B60L 3/0046* (2013.01); *B64C 29/00* (2013.01); *B64D 27/33* (2024.01); *B64D 27/357* (2024.01); *B64D 31/06* (2013.01); *B64D 31/18* (2024.01); *B64D 35/024* (2024.01); *F02C 9/56* (2013.01); *B64D 27/026* (2024.01)

(58) Field of Classification Search

CPC ..... B64C 29/00; B64C 29/02; B64C 29/0083; B64D 27/026; F02C 9/56

See application file for complete search history.

(56) References Cited

U.S. PATENT DOCUMENTS 4,444,285 A 4/1984 Stewart et al.
9,376,208 B1 6/2016 Gentry (Continued)

FOREIGN PATENT DOCUMENTS

CN 107069930 A 8/2017
CN 108494167 A 9/2018

(Continued)

*Primary Examiner* — Gerald L Sung
(74) *Attorney, Agent, or Firm* — Fox Rothschild LLP

(57) ABSTRACT

A powertrain control system is provided for a vertical take-off and landing aerial vehicle for urban air mobility. A powertrain of the vertical take-off and landing aerial vehicle is a hybrid type powertrain, in which the output shaft of a rotor driving motor is directly connected to a rotor, a battery is connected to the rotor driving motor to supply power thereto, and an engine and a generator are connected to a battery to charge and discharge the battery. The driving of the engine and the generator is controlled based on required power of the motor and the SOC of the battery in each flight step of the vertical take-off and landing aerial vehicle, and the SOC of the battery is constantly maintained at a predetermined level or higher.

6 Claims, 8 Drawing Sheets

(51) Int. Cl.

| | |
|---|---|
| ***B64D 35/024*** | (2024.01) |
| ***F02C 9/56*** | (2006.01) |
| *B64D 27/02* | (2006.01) |

(56) References Cited

U.S. PATENT DOCUMENTS

2008/0169375 A1 7/2008 Ishikawa
2015/0143811 A1 5/2015 Pang et al.
2019/0118793 A1 4/2019 Jang
2020/0031481 A1 1/2020 Gazzino et al.
2020/0148374 A1 5/2020 Kawai
2021/0316874 A1* 10/2021 Resnick ................. B64U 20/94
2022/0042465 A1* 2/2022 Swann ...................... F02C 6/00
2022/0297846 A1* 9/2022 Mark ..................... B64D 27/24
2022/0306307 A1* 9/2022 Tsutsumi ................ B60L 58/13

FOREIGN PATENT DOCUMENTS

CN 111907719 A 11/2020
KR 20140012457 A 2/2014
KR 20140026038 A 3/2014
KR 20190025778 A 3/2019
WO 2015/064767 A1 5/2015
WO 2018155700 A1 8/2018
WO 2019/116587 A1 6/2019
WO 2020/190223 A1 9/2020

* cited by examiner

POWERTRAIN CONTROL SYSTEM AND METHOD OF VTOL AERIAL VEHICLE

CROSS-REFERENCE TO RELATED APPLICATION

This application is a division of U.S. patent application Ser. No. 17/509,694, filed on Oct. 25, 2021, which is based on and claims, under 35 U.S.C. § 119(a), the benefit of priority to Korean Patent Application No. 10-2021-0014484 filed on Feb. 2, 2021, the entire contents of which are incorporated herein by reference.

BACKGROUND

(a) Technical Field

The present disclosure relates to a powertrain control system and method of a vertical take-off and landing aerial vehicle, and more particularly to a powertrain control system and method of a vertical take-off and landing aerial vehicle for urban air mobility, wherein the residual amount of a battery is maintained at a predetermined level or higher using power of an engine and a generator in addition to a motor during flight of the aerial vehicle.

(b) Background Art

In recent years, urban air mobility (UAM) for future transportation and traffic systems has been researched and developed. Research and development items for urban air mobility include a vertical take-off and landing (VTOL) aerial vehicle using a rotor or a propeller. As shown in FIG. 1, a vertical take-off and landing aerial vehicle 100 is an aerial vehicle that is capable of performing vertical take-off and landing and flight using a rotor or a propeller. The vertical take-off and landing aerial vehicle basically includes a body 110 for seating passengers, wings 120 formed at opposite sides of the body 100, and a propeller type rotor 130 rotatably mounted to the outer end of each of the wings 120 to generate substantial lift.

In addition, a powertrain for driving of the vertical take-off and landing aerial vehicle may be configured as an internal combustion engine type powertrain, in which the output shaft of an engine 20 is directly connected to the rotor 130, as shown in FIG. 2, or as an electromotive powertrain, in which the output shaft of a rotor driving motor 10 is directly connected to the rotor 130 and a battery 40 is connected to the motor 10 so as to supply power to the motor, as shown in FIG. 3.

As shown in FIG. 1, the overall flight process of the vertical take-off and landing aerial vehicle includes (1) a take-off preparation step, (2) a vertical take-off step of vertically ascending to a predetermined height, (3) a hovering step of temporarily stopping for horizontal flight preparation, (4) a transition step of moving to an altitude for horizontal flight, (5) an acceleration step of accelerating to a speed for horizontal flight, (6) a cruising step of cruising to a destination at a predetermined speed, (7) a deceleration step of decelerating for landing after approaching the destination, (8) a transition step of moving to an altitude for vertical landing, (9) a hovering step of temporarily stopping for vertical landing preparation, (10) a vertical landing step of vertically descending to the destination, and (11) a vertical landing completion step.

In general, required power of the engine or the motor for driving of the aerial vehicle is highest in the vertical take-off step, the vertical landing step, the hovering steps, and the transition steps, among the steps of the overall flight process of the aerial vehicle. In particular, for a vertical take-off and landing aerial vehicle equipped with an electromotive powertrain, available output power of the motor that uses battery power is high in the take-off step, in which the state of charge (SOC) of the battery is sufficient, but the SOC of the battery is insufficient in the landing step after the cruising step, in which the battery is continuously discharged. As a result, the output of the motor is insufficient, which negatively affects flight control of the aerial vehicle.

To maintain the SOC of the battery at a predetermined level or more in the overall flight process of the aerial vehicle, therefore, the capacity of the battery mounted in the aerial vehicle may be increased. In particular, however, the weight of the aerial vehicle may be increased and costs may be increased.

The above information disclosed in this section is provided merely for enhancement of understanding of the background of the invention and therefore it may contain information that does not form the prior art that is already known in this country to a person of ordinary skill in the art.

SUMMARY

The present invention has been made in an effort to solve the above-described problems associated with the prior art.

It is an object of the present invention to provide a powertrain control system and method of a vertical take-off and landing aerial vehicle for urban air mobility, wherein a powertrain of the vertical take-off and landing aerial vehicle is a hybrid type powertrain, in which the output shaft of a rotor driving motor is directly connected to a rotor, a battery is connected to the rotor driving motor to supply power thereto, and an engine and a generator are connected to a battery to charge and discharge the battery, and wherein driving of the engine and the generator is controlled based on required power of the motor and the SOC of the battery in each flight step of the vertical take-off and landing aerial vehicle, whereby the SOC of the battery is constantly maintained at a predetermined level or higher.

The objects of the present invention are not limited to those described above, and other unmentioned objects of the present invention will be clearly understood by a person of ordinary skill in the art (hereinafter referred to as an "ordinary skilled person") from the following description.

In order to accomplish the object, in an aspect, the present invention provides a powertrain control system of a vertical take-off and landing aerial vehicle, the powertrain control system including a rotor driving motor directly connected to a rotor of the vertical take-off and landing aerial vehicle, a battery connected to the rotor driving motor to supply power to the motor, a generator connected to the battery to charge and discharge the battery, an engine connected to the generator to transmit power to the generator, and a control device configured to control driving of the engine and the generator to charge the battery and to determine take-off and landing standby or not of the vertical take-off and landing aerial vehicle.

The control device may include a flight controller configured to provide required power of the motor and information about the current flight step of the vertical take-off and landing aerial vehicle, a battery controller configured to provide information about the SOC of the battery, information about a battery discharge limit, and information about a battery charge limit, an engine controller configured to provide a catalyst heating request signal, an oxygen sensor diagnosis request signal, and information about the current RPM of the engine, a generator controller configured to provide information about a generator torque limit and information about RPM of the generator, and a main controller configured to control driving of the engine and the generator based on the information provided by the flight controller, the battery controller, the engine controller, and the generator controller and to determine take-off approval or take-off standby of the vertical take-off and landing aerial vehicle or to determine landing approval or landing standby of the vertical take-off and landing aerial vehicle.

The main controller may include an engine driving mode determination unit configured to determine an engine driving mode to be one of engine stop, engine passive run, engine idle, engine part load, and engine full load, an engine driving amount calculation unit configured to calculate target torque of the engine and target RPM of the engine for charging the battery, a required engine torque determination unit configured to determine approval of injection of fuel to the engine, an engine torque command, approval of catalyst heating, and approval of engine self-diagnosis, a required generator torque determination unit configured to determine a generator torque command, and a take-off and landing standby request unit configured to determine take-off standby or landing standby of the vertical take-off and landing aerial vehicle.

When required power of the motor is equal to or greater than a predetermined level, the engine driving mode determination unit may be configured to determine the engine driving mode to be engine part load or engine full load such that the output of the engine assists in charging the battery. When the SOC of the battery is determined to be equal to or less than a reference value or the battery discharge limit is determined to be equal to or less than a reference value, the engine driving mode determination unit may be configured to determine the engine driving mode to be engine part load or engine full load such that the battery is charged as the result of driving of the generator according to driving of the engine.

When there is a catalyst heating request signal, the engine driving mode determination unit may be configured to determine the engine driving mode to be engine idle such that a catalyst is heated to a predetermined temperature or higher before take-off. When there is an oxygen sensor diagnosis request signal for engine self-diagnosis, the engine driving mode determination unit may be configured to determine the engine driving mode to be engine passive run.

When the engine driving mode is determined to be engine part load or engine full load, the required engine torque determination unit may be configured to transmit a signal for determining approval of injection of fuel to the engine and an engine torque command configured such that the torque and RPM of the engine reach the target torque and RPM of the engine and at the same time is adjusted to be less than the generator torque limit to the engine controller in interlocking with the current RPM of the engine.

When the engine driving mode is determined to be engine idle, the required engine torque determination unit may be configured to transmit a signal for determining approval of injection of fuel to the engine and a signal for approval of catalyst heating to the engine controller in interlocking with the current RPM of the engine. When the engine driving mode is determined to be engine passive run, the required engine torque determination unit may be configured to transmit a signal for approval of engine self-diagnosis to the engine controller in interlocking with the current RPM of the engine.

When the SOC of the battery is equal to or less than the reference value, the battery discharge limit is equal to or less than the reference value, or catalyst heating is being performed in the engine idle state, the take-off and landing standby request unit may be configured to transmit a take-off standby signal to the flight controller. When the SOC of the battery is equal to or less than the reference value, the battery discharge limit is equal to or less than the reference value, or there is no fuel injection while the RPM of the engine is equal to or less than a reference value, the take-off and landing standby request unit may be configured to transmit a landing standby signal to the flight controller.

To accomplish the object, in another aspect, the present invention provides a powertrain control method of a vertical take-off and landing aerial vehicle, the powertrain control method including determining the current flight step of the vertical take-off and landing aerial vehicle, sequentially performing an engine driving mode determination step, an engine driving amount calculation step, a required engine torque determination step, and a required generator torque determination step for the determined flight step in order to drive an engine, and driving a generator according to driving of the engine and charging a battery with power generated by the generator.

When an engine driving mode is determined to be engine part load or engine full load for the determined flight step, target torque of the engine and target RPM of the engine are calculated, and approval of injection of fuel to the engine and an engine torque command are determined, the generator may be driven according to driving of the engine and the battery may be charged with power generated by the generator.

When the current flight step is determined to be a take-off preparation step, the engine driving mode determination step, the engine driving amount calculation step, the required engine torque determination step, and the required generator torque determination step may be sequentially performed, and then a step of determining take-off standby or not may be performed. When there is a catalyst heating request signal in the engine driving mode determination step, the engine driving mode may be determined to be engine idle and a catalyst may be heated to a predetermined temperature or higher before take-off.

When the SOC of the battery is equal to or less than a reference value, a battery discharge limit is equal to or less than a reference value, or catalyst heating is being continuously performed in the step of determining take-off standby or not, a take-off standby request signal may be transmitted from a main controller to a flight controller such that the vertical take-off and landing aerial vehicle is maintained in a take-off standby state.

Additionally, when the current flight step is determined to be a cruising step or a take-off preparation step and there is an oxygen sensor diagnosis request signal for engine self-diagnosis, the engine driving mode may be determined to be engine passive run, and engine self-diagnosis for analyzing a detected signal of an oxygen sensor may be performed. When the current flight step is determined to be a cruising step approaching a destination, the engine driving mode determination step, the engine driving amount calculation step, the required engine torque determination step, and the required generator torque determination step may be sequentially performed, and then a step of determining landing standby or not may be performed.

When the SOC of the battery is equal to or less than the reference value, the battery discharge limit is equal to or less than the reference value, RPM of the engine is equal to or less than a reference value, or no fuel is injected in the step of determining landing standby or not, a landing standby request signal may be transmitted from the main controller to the flight controller such that the vertical take-off and landing aerial vehicle is maintained in a landing standby state.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
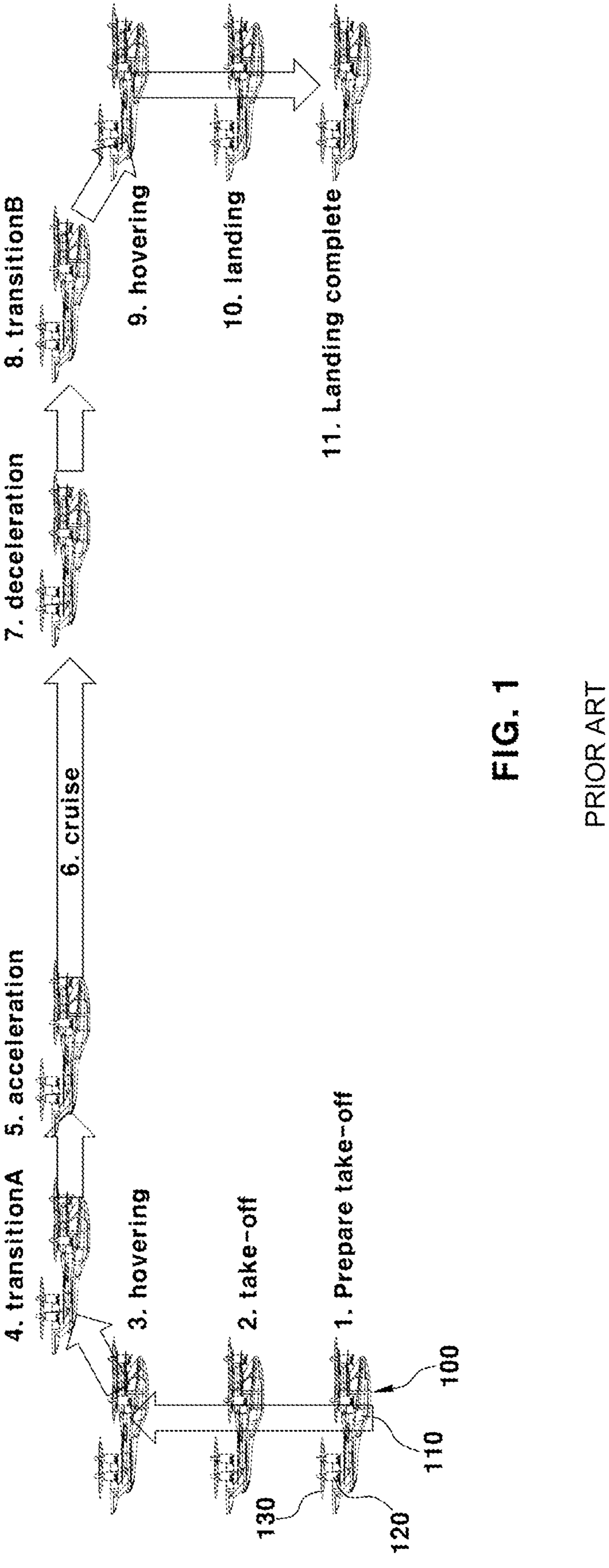
FIG. 1 is a schematic view showing a vertical take-off and landing aerial vehicle for urban air mobility and flight steps thereof.
Figure 2:
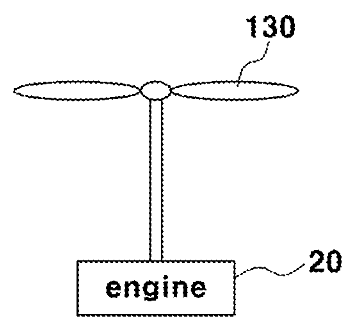
FIG. 2 is a schematic view showing an internal combustion engine type powertrain applied to the vertical take-off and landing aerial vehicle.
Figure 3:
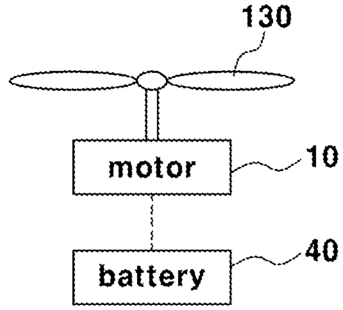
FIG. 3 is a schematic view showing an electromotive powertrain applied to the vertical take-off and landing aerial vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a". "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, preferred embodiments of the present invention will be described in detail with reference to the accompanying drawings.

Figure 4:
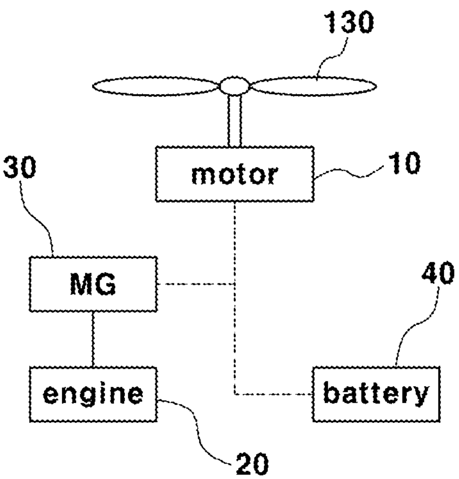
FIG. 4 is a schematic view showing a hybrid type powertrain applied to a vertical take-off and landing aerial vehicle according to the present invention.

FIG. 4 is a schematic view showing a hybrid type powertrain applied to a vertical take-off and landing aerial vehicle according to the present invention.

As shown in FIG. 4, the powertrain of the vertical take-off and landing aerial vehicle according to the present invention is a hybrid type powertrain, in which the output shaft of a rotor driving motor 10 is directly connected to a rotor 130 to transmit power thereto, a battery 40 is connected to the rotor driving motor 10 to supply power thereto, and an engine 20 and a generator 30, which are connected to each other in series, are connected to a battery 40 to charge and discharge the battery.

More specifically, the generator 30 is connected to the battery 40 to charge and discharge the battery, and the engine 20 is connected to the generator 30 to transmit power thereto. When the rotor driving motor 10 is driven by power from the battery 40, the rotor 130, which is connected to the output shaft of the motor 10, is rotated, whereby the overall flight process of the vertical take-off and landing aerial vehicle may be performed. In addition, the battery 40 may be charged by driving of the engine 20 and the generator 30.

At this time, the overall flight process of the vertical take-off and landing aerial vehicle having the hybrid type powertrain applied thereto may include (1) a take-off preparation step, (2) a vertical take-off step of vertically ascending to a predetermined height, (3) a hovering step of temporarily stopping for horizontal flight preparation, (4) a transition step of moving to an altitude for horizontal flight, (5) an acceleration step of accelerating to a speed for horizontal flight, (6) a cruising step of cruising to a destination at a predetermined speed, (7) a deceleration step of decelerating for landing after approaching the destination, (8) a transition step of moving to an altitude for vertical landing, (9) a hovering step of temporarily stopping for vertical landing preparation, (10) a vertical landing step of vertically descending to the destination, and (11) a vertical landing completion step, as previously described with reference to FIG. 1.

The present invention is characterized in that, in the overall flight process of the vertical take-off and landing aerial vehicle, the battery 40 is charged with power generated by the generator 30 according to driving of the engine 20 based on required power of the motor and the SOC of the battery, whereby the SOC of the battery is constantly maintained at a predetermined level or higher. Accordingly, a powertrain control system according to the present invention may include a control device 200 for controlling driving of the engine and the generator based on required power of the motor and the SOC of the battery.

Figure 5:
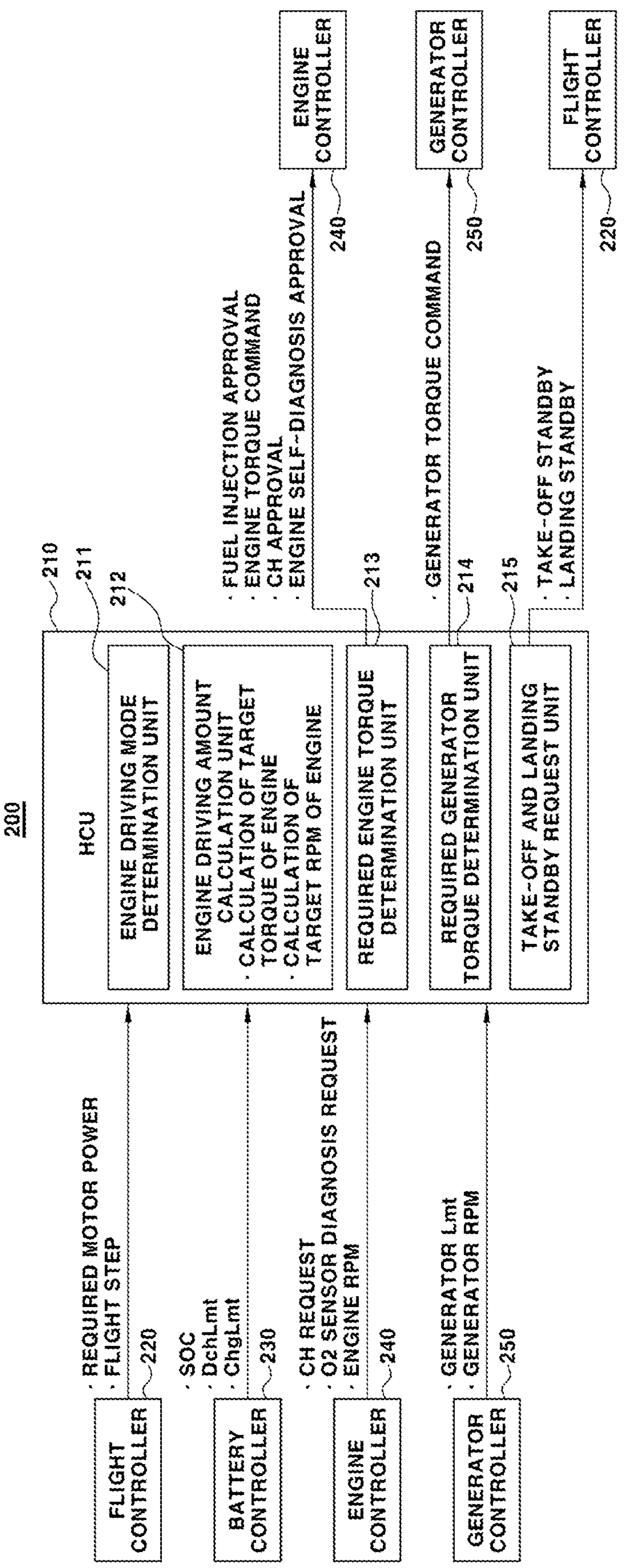
FIG. 5 is a schematic view showing a control device for a powertrain control system of the vertical take-off and landing aerial vehicle according to the present invention.

FIG. 5 is a schematic view showing the control device for the powertrain control system of the vertical take-off and landing aerial vehicle according to the present invention. As shown in FIG. 5, the control device 200 may include a main controller 210, which is a top-level controller, a flight controller 220, a battery controller 230, an engine controller 240, and a generator controller 250, or may be constituted by a single integrated controller.

The flight controller 220, which is provided to operate the rotor driving motor 10 and the flight process, may be configured to provide required power of the motor (required power of the rotor driving motor) and information about the current flight step, which is one of the steps (1) to (11) constituting the overall flight process of the vertical take-off and landing aerial vehicle, to the main controller 210 and to receive a take-off standby or landing standby command from the main controller 210.

The battery controller 230 may be configured to provide information about the SOC of the battery, information about a battery discharge limit DchLmt, and information about a battery charge limit ChgLmt to the main controller 210. The engine controller 240 may be configured to provide a catalyst heating (CH) request signal, which is provided when temperature of a catalyst for purifying exhaust gas of the engine, is equal to or less than a reference value, an oxygen sensor diagnosis request signal for engine self-diagnosis, and information about the current RPM of the engine to the main controller 210 and to receive an engine fuel injection approval signal, an engine torque command, a catalyst heating approval signal for purifying exhaust gas of the engine, and a signal for approval of engine self-diagnosis from the main controller 210.

The generator controller 250 may be configured to provide information about a generator torque limit Lmt and information about RPM of the generator to the main controller 210 and to receive a generator torque command from the main controller 210. The main controller 210 may be configured to control driving of the engine and the generator based on the information provided by the flight controller 220, the battery controller 230, the engine controller 240, and the generator controller 250 and to determine take-off approval or take-off standby or to determine landing approval or landing standby.

Accordingly, the main controller 210 may include an engine driving mode determination unit 211, an engine driving amount calculation unit 212, a required engine torque determination unit 213, a required generator torque determination unit 214, and a take-off and landing standby request unit 215.

The engine driving mode determination unit 211 may be configured to determine the engine driving mode to be one of engine stop, engine passive run, in which the engine is rotated by driving of the generator, engine idle, engine part load, and engine full load based on the information about the required power of the motor and the information about the current flight step provided by the flight controller 220, the information about the SOC of the battery and the information about the battery discharge limit DchLmt provided by the battery controller 230, and the catalyst heating (CH) request signal and the oxygen sensor diagnosis request signal provided by the engine controller 240.

For example, when required power of the motor in the current flight step is determined to be equal to or greater than a predetermined level at the time of determining the engine driving mode, the engine driving mode determination unit 211 may be configured to determine the engine driving mode to be the engine part load, in which the maximum engine torque is output when the engine is driven under the condition in which engine lambda (theoretical air-fuel ratio) $<1$, or the engine full load, in which the maximum possible engine torque is output, such that the output of the engine assists in charging the battery in consideration of the fact that the amount of discharge of the battery is increased.

Alternatively, when the SOC of the battery is determined to be equal to or less than a reference value or the battery discharge limit is determined to be equal to or less than a reference value at the time of determining the engine driving mode, the engine driving mode determination unit 211 may be configured to determine the engine driving mode to be one of the engine part load and the engine full load such that the battery is charged as the result of driving of the generator according to driving of the engine.

Additionally, when there is a catalyst heating (CH) request signal at the time of determining the engine driving mode, the engine driving mode determination unit 211 may be configured to determine the engine driving mode to be engine idle such that the catalyst is heated to a predetermined temperature or higher before take-off. Alternatively, when there is an oxygen sensor diagnosis request signal for engine self-diagnosis at the time of determining the engine driving mode, the engine driving mode determination unit 211 may be configured to determine the engine driving mode to be engine passive run and transmit a signal for approval of engine self-diagnosis to the engine controller 240 in interlocking with the current RPM of the engine.

The engine driving amount calculation unit 212, which is provided to calculate the engine driving amount for charging the battery, may be configured to calculate target torque of the engine and target RPM of the engine for charging the battery based on the engine driving mode determined by the engine driving mode determination unit 211, the information about the required power of the motor provided by the flight controller 220, the information about the SOC of the battery, the information about the battery charge limit ChgLmt, and the information about the battery discharge limit DchLmt, and the information about the generator torque limit Lmt provided by the generator controller 250.

For example, when the required power of the motor is equal to or greater than the predetermined level at which the battery discharge amount is increased, the SOC of the battery is equal to or less than the reference value, or the battery discharge limit is equal to or less than the reference value, and the engine driving mode is determined to be one of engine idle, engine part load, and engine full load, the engine driving amount calculation unit 212 may be configured to calculate the target torque of the engine and the target RPM of the engine for driving the generator such that the battery is charged by driving of the generator.

The required engine torque determination unit 213 may be configured to determine approval of injection of fuel to the engine, the engine torque command, approval of catalyst heating (CH), and approval of engine self-diagnosis based on the engine driving mode determined by the engine driving mode determination unit 211, information about the target torque and RPM of the engine calculated by the engine driving amount calculation unit 212, the information about the current RPM of the engine provided by the engine controller 240, and the information about the generator torque limit Lmt provided by the generator controller 250.

For example, when the engine driving mode is determined to be the engine part load or the engine full load, the required engine torque determination unit 213 may be configured to transmit a signal for determining approval of injection of fuel to the engine to the engine controller 240 in interlocking with the current RPM of the engine (e.g. about 50 to 900 RPM) and transmits an engine torque command configured such that the torque and RPM of the engine reach the target torque and RPM of the engine and at the same time is adjusted to be less than the generator torque limit to the engine controller 240.

Alternatively, when the engine driving mode is determined to be engine idle, the required engine torque determination unit 213 may be configured to transmit a signal for determining approval of injection of fuel to the engine to the engine controller 240 in interlocking with the current RPM of the engine (e.g. about 50 to 900 RPM) and transmit a signal for approval of catalyst heating (CH) to the engine controller 240. Alternatively, when the engine driving mode is determined to be engine passive run, the required engine torque determination unit 213 may be configured to transmit a signal for approval of engine self-diagnosis to the engine controller 240 in interlocking with the current RPM of the engine (e.g. 50 to 900 RPM).

The required generator torque determination unit 214 may be configured to determine a generator torque command based on information about the engine torque command determined by the required engine torque determination unit 213, the information about the target torque and RPM of the engine calculated by the engine driving amount calculation unit 212, and the information about the RPM of the generator provided by the generator controller 250 and to transmit the determined generator torque command to the generator controller 250.

The take-off and landing standby request unit 215 may be configured to transmit a take-off standby signal to the flight controller 220 when the SOC of the battery is equal to or less than the reference value, the battery discharge limit is equal to or less than the reference value, or catalyst heating is being performed in the engine idle state. In addition, the take-off and landing standby request unit 215 may be configured to transmit a landing standby signal to the flight controller 220 when the SOC of the battery is equal to or less than the reference value, the battery discharge limit is equal to or less than the reference value, or there is no fuel injection while the RPM of the engine is equal to or less than a reference value.

Hereinafter, a powertrain control method of the vertical take-off and landing aerial vehicle constructed as described above will be described.

The control method according to the present invention may include: a step of determining the current flight step of the vertical take-off and landing aerial vehicle; a step of sequentially performing an engine driving mode determination step, an engine driving amount calculation step, a required engine torque determination step, and a required generator torque determination step for the determined flight step in order to drive the engine; and a step of driving the generator according to driving of the engine and charging the battery with power generated by the generator.

Figure 6:
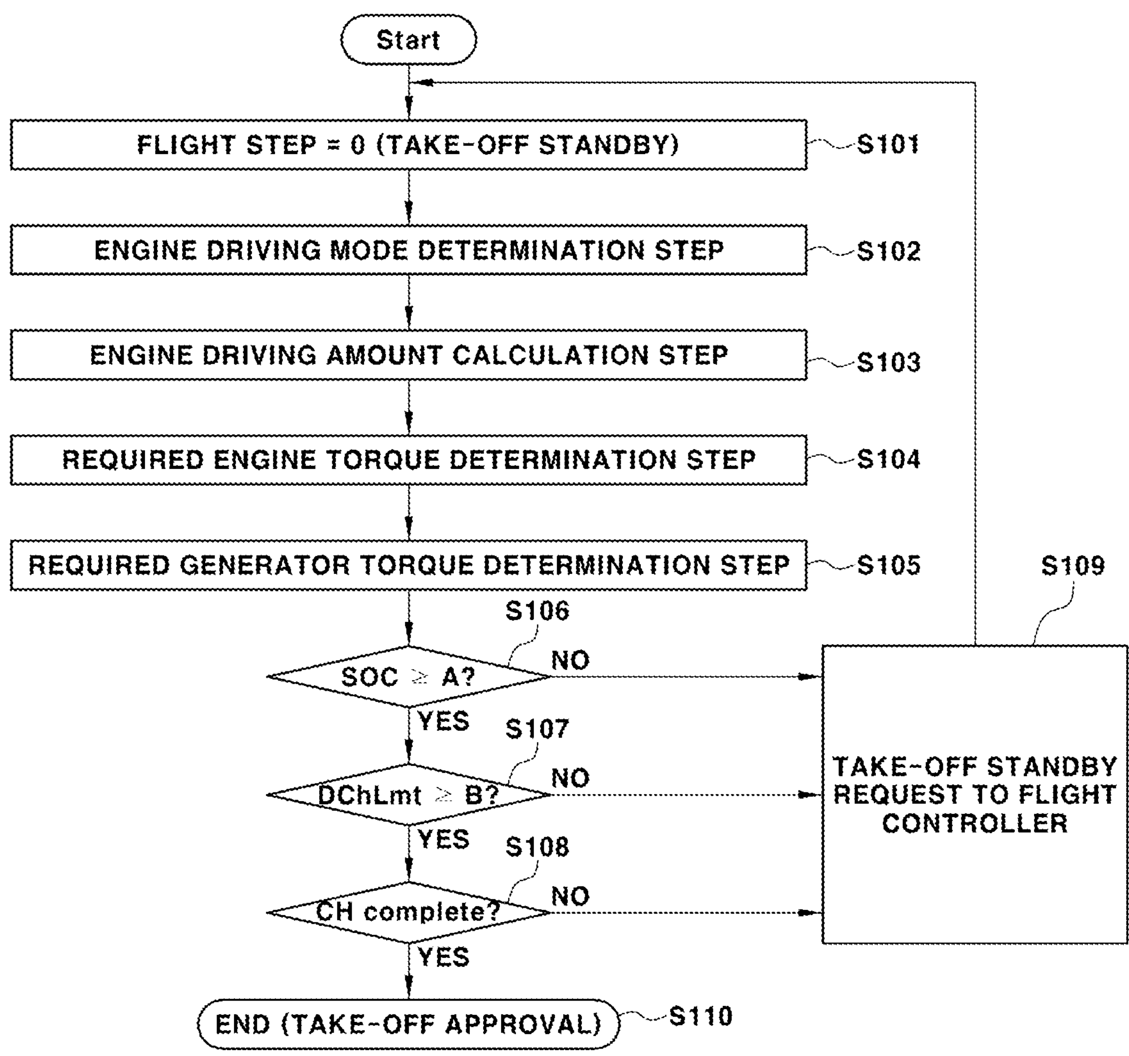
FIGS. 6 to 9 are flowcharts showing a powertrain control method of the vertical take-off and landing aerial vehicle according to the present invention.

FIG. 6 is a flowchart showing the powertrain control method of the vertical take-off and landing aerial vehicle according to the present invention in the take-off standby state. First, the current flight step of the vertical take-off and landing aerial vehicle may be determined, and the current flight step may be determined to be a take-off preparation state. For example, when the flight controller 220 provides information about the current flight step, which is one of steps (1) to (11) constituting the overall flight process of the vertical take-off and landing aerial vehicle, to the main controller 210, the main controller 210 may be configured to determine the current flight step to be step (1), i.e. a take-off preparation step.

In response to determining that the current flight step is the take-off preparation step (S101), the main controller 210 may be configured to sequentially perform an engine driving mode determination step (S102), an engine driving amount calculation step (S103), a required engine torque determination step (S104), and a required generator torque determination step (S105). Additionally, to determine take-off standby or not, the main controller 210 sequentially performs a step (S106) of comparing the SOC of the battery with a reference value A, a step (S107) of comparing the battery discharge limit DchLmt with a reference value B, and a step (S108) of determining whether catalyst heating CH has been completed.

In the case in which the SOC of the battery is equal to or less than the reference value as the result of comparison in step S106, the battery discharge limit is equal to or less than the reference value as the result of comparison in step S107, or catalyst heating is being continuously performed as the result of determination in step S108, the take-off and landing standby request unit 215 of the main controller 210 transmits a take-off standby request signal to the flight controller 220 (S109), whereby the vertical take-off and landing aerial vehicle is continuously maintained in the take-off standby state until catalyst heating is completed while the SOC of the battery reaches the maximum value.

At this time, when the temperature of the catalyst is less than a reference value, it may be determined that catalyst heating is being continuously performed in the engine idle state, and, when the temperature of the catalyst is equal to or greater than the reference value, it may be determined that catalyst heating has been completed.

Meanwhile, the engine driving mode may be determined to be the engine part load or the engine full load, which is capable of assisting in charging the battery, in the engine driving mode determination step (S102), target torque of the engine and target RPM of the engine for charging the battery may be calculated in the engine driving amount calculation step (S103), and approval of injection of fuel to the engine and an engine torque command may be determined in the required engine torque determination step (S104), whereby the engine may be continuously driven to charge the battery.

The generator may be driven according to driving of the engine, and the battery may be charged with power generated by the generator, whereby the SOC of the battery may reach the maximum value.

Additionally, when there is a catalyst heating (CH) request signal at the time of determining the engine driving mode in the engine driving mode determination step (S102), the engine driving mode may be determined to be the engine idle such that the catalyst is heated to a predetermined temperature or greater before take-off, and, when the temperature of the catalyst is equal to or greater than the reference value, it may be determined that catalyst heating has been completed.

In response to determining that the SOC of the battery exceeds the reference value, the battery discharge limit exceeds the reference value, and catalyst heating has been completed, therefore, the main controller 210 may be configured to transmit a take-off approval signal to the flight controller 220 (S110), whereby the vertical take-off and landing aerial vehicle enters a take-off step.

Figure 7:
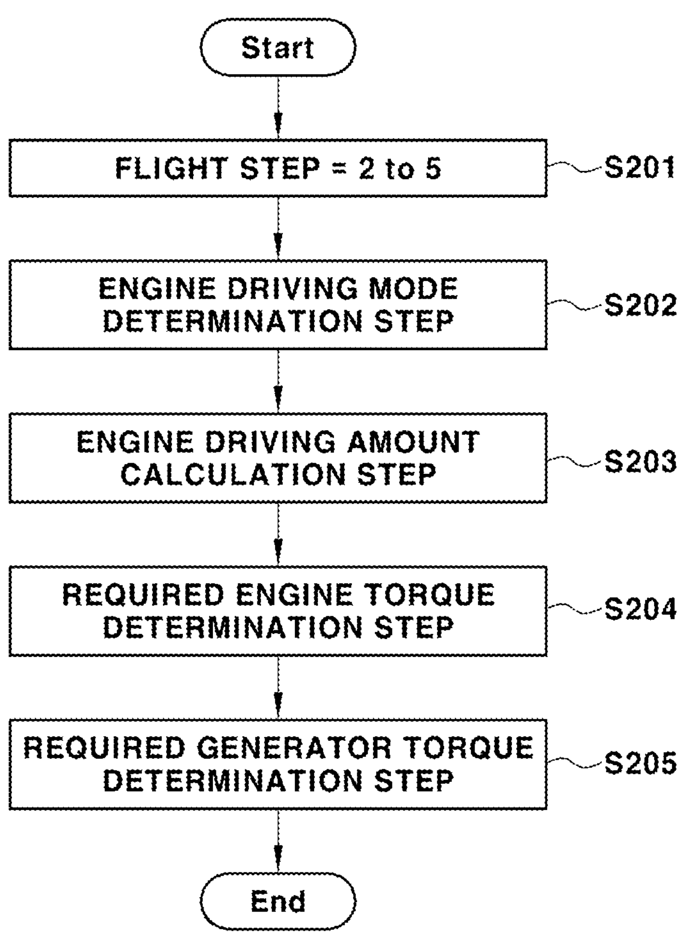

FIG. 7 is a flowchart showing the powertrain control method of the vertical take-off and landing aerial vehicle according to the present invention from the vertical take-off step to the acceleration step.

Since the required output of the rotor driving motor using the power of the battery is highest in (2) the vertical take-off step of vertically ascending to the predetermined height, (3) the hovering step of temporarily stopping for horizontal flight preparation, (4) the transition step of moving to the altitude for horizontal flight, and (5) the acceleration step of accelerating to the speed for horizontal flight, among the steps of the overall flight process of the vertical take-off and landing aerial vehicle, the output of the engine continuously assists in charging the battery.

Accordingly, in response to determining that the current flight step is steps (2) to (5) (S201), the main controller 210 may be configured to perform an engine driving mode determination step (S202), an engine driving amount calculation step (S203), a required engine torque determination step (S204), and a required generator torque determination step (S205) again.

The engine driving mode may be determined to be engine part load or engine full load, which is capable of assisting in charging the battery, in the engine driving mode determination step (S202), target torque of the engine and target RPM of the engine for charging the battery may be calculated in the engine driving amount calculation step (S203), and approval of injection of fuel to the engine and an engine torque command may be determined in the required engine torque determination step (S204), whereby the engine may be continuously driven in order to charge the battery. Consequently, the generator is driven according to driving of the engine and the battery is charged with power generated by the generator, whereby the SOC of the battery is constantly maintained at the predetermined level or higher.

Meanwhile, in (6) the cruising step of cruising to the destination at the predetermined speed, which is one of the steps constituting the overall flight process of the vertical take-off and landing aerial vehicle, required power of the motor is not high due to lift of fixed wings, whereby engine self-diagnosis may be performed. Engine self-diagnosis may be performed even in the take-off standby step.

Accordingly, when the engine controller 240 provides an oxygen sensor diagnosis request signal for engine self-diagnosis to the main controller 210, the engine driving mode determination unit 211 of the main controller 210 may be configured to determine the engine driving mode to engine passive run such that the engine is rotated by driving of the generator. When power of the battery is supplied to the generator and the generator is driven, therefore, the engine is rotated by driving of the generator in the state in which the engine is not ignited, whereby only new air is provided to an engine combustion chamber.

When an oxygen sensor mounted at a predetermined position of the engine detects the amount of new air introduced into the engine and transmits a detected signal to the main controller 210, therefore, the main controller 210 may be configured to analyze the detected signal of the oxygen sensor to determine whether the amount of the new air is lean or rich. In response to determining that the amount of the new air is rich, a process of turning on a warning lamp indicating that it is necessary to inspect the engine may be performed.

Figure 8:
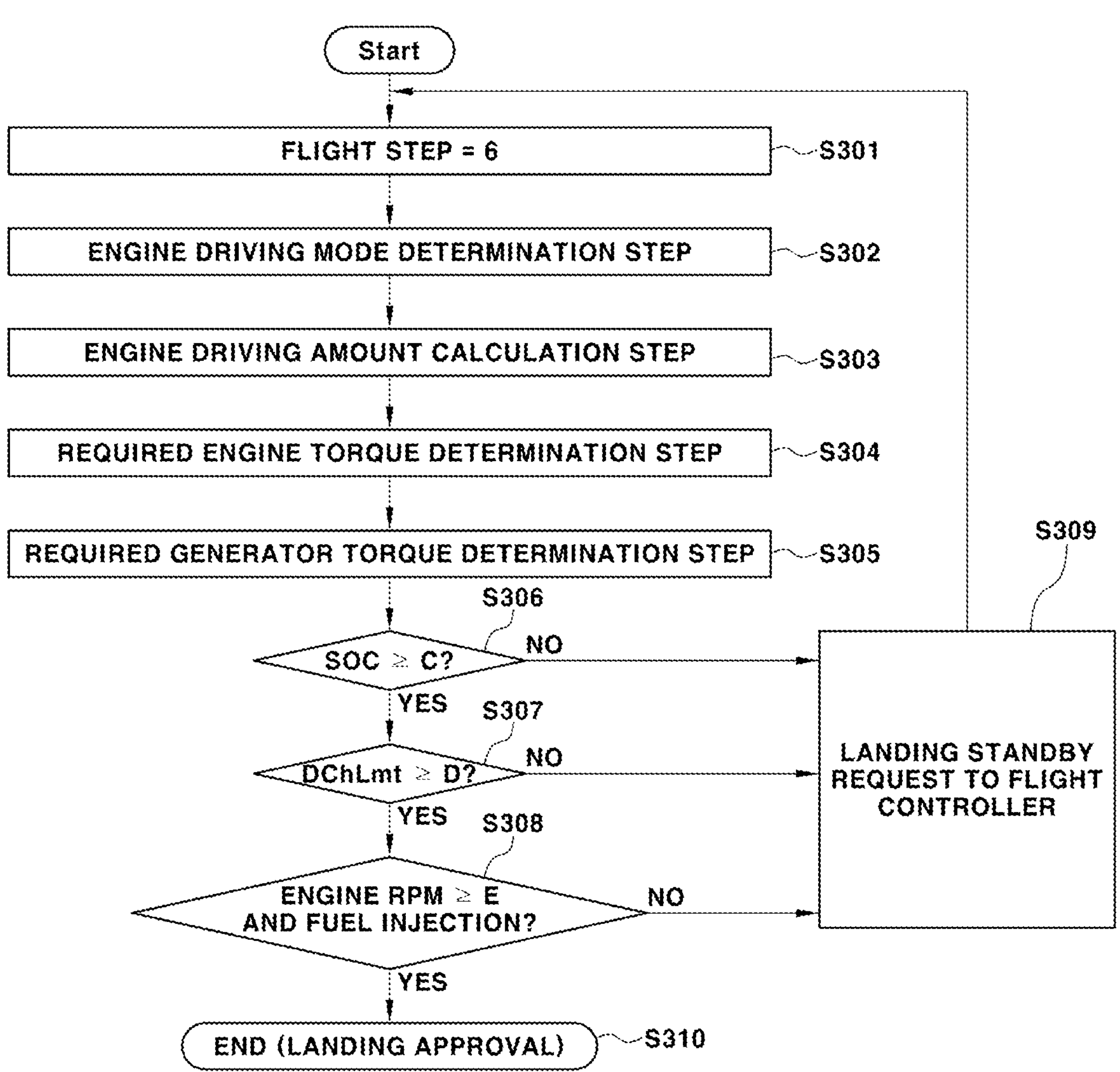

FIG. 8 is a flowchart showing the powertrain control method of the vertical take-off and landing aerial vehicle according to the present invention in the cruising step.

In (6) the cruising step of cruising to the destination at the predetermined speed, which is one of the steps constituting the overall flight process of the vertical take-off and landing aerial vehicle, required power of the motor is not high due to lift of the fixed wings. When the vertical take-off and landing aerial vehicle approaches the destination through the cruising step, however, the battery is charged using output of the engine to maintain the SOC of the battery to the reference value or more.

Accordingly, in response to determining that the current flight step is step (6), i.e. the step of cruising to the destination (S301), the main controller 210 may be configured to perform an engine driving mode determination step (S302), an engine driving amount calculation step (S303), a required engine torque determination step (S304), and a required generator torque determination step (S305) again. Additionally, to determine landing standby or not, the main controller 210 sequentially performs a step (S306) of comparing the SOC of the battery with a reference value C, a step (S307) of comparing the battery discharge limit DchLmt with a reference value D, and a step (S308) of comparing RPM of the engine with a reference value E and at the same time determining fuel injection or not.

When the SOC of the battery is equal to or less than the reference value as the result of comparison in step S306, the battery discharge limit is equal to or less than the reference value as the result of comparison in step S307, or the RPM of the engine is equal to or less than the reference value E or it is determined that fuel injection is not performed as the result of comparison and determination in step S108, the take-off and landing standby request unit 215 of the main controller 210 may be configured to transmit a landing standby request signal to the flight controller 220 (S309), whereby the vertical take-off and landing aerial vehicle is continuously maintained in the landing standby state At this time, the engine driving mode may be determined to be engine part load or engine full load, which is capable of assisting in charging the battery, in the engine driving mode determination step (S302), target torque of the engine and target RPM of the engine for charging the battery may be calculated in the engine driving amount calculation step (S303), and approval of injection of fuel to the engine and an engine torque command may be determined in the required engine torque determination step (S304), whereby the engine may be continuously driven to charge the battery.

The generator may be driven according to driving of the engine, and the battery may be charged with power generated by the generator, whereby the SOC of the battery may reach the maximum value. In response to determining that the SOC of the battery exceeds the reference value, the battery discharge limit exceeds the reference value, and fuel injection is performed while the RPM of the engine for charging the battery exceeds the reference value E, therefore, the main controller 210 may be configured to transmit a landing approval signal to the flight controller 220 (S310), whereby the vertical take-off and landing aerial vehicle may enter a landing step.

Figure 9:
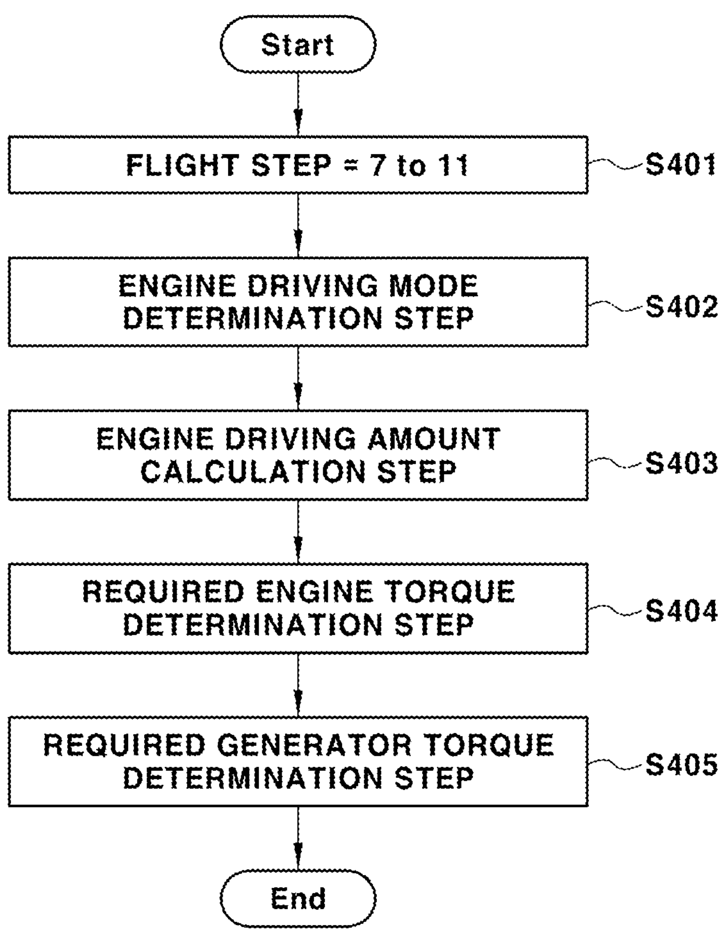

FIG. 9 is a flowchart showing the powertrain control method of the vertical take-off and landing aerial vehicle according to the present invention from the deceleration step to the vertical landing completion step.

Since the required output of the rotor driving motor using the power of the battery is highest in (7) the deceleration step of decelerating for landing after approaching the destination, (8) the transition step of moving to the altitude for vertical landing, (9) the hovering step of temporarily stopping for vertical landing preparation, (10) the vertical landing step of vertically descending to the destination, and (11) the vertical landing completion step, among the steps of the overall flight process of the vertical take-off and landing aerial vehicle, the output of the engine continuously assists in charging the battery.

Accordingly, in response to determining that the current flight step is the steps (7) to (11) (S401), the main controller 210 may be configured to perform an engine driving mode determination step (S402), an engine driving amount calculation step (S403), a required engine torque determination step (S404), and a required generator torque determination step (S405) again.

The engine driving mode may be determined to be the engine part load or the engine full load, which is capable of assisting in charging the battery, in the engine driving mode determination step (S402), target torque of the engine and target RPM of the engine for charging the battery may be calculated in the an engine driving amount calculation step (S403), and approval of injection of fuel to the engine and an engine torque command may be determined in the required engine torque determination step (S404), whereby the engine may be continuously driven to charge the battery. Consequently, the generator is driven according to driving of the engine and the battery is charged with power generated by the generator, whereby the SOC of the battery is constantly maintained at the predetermined level or higher.

In the present invention, as described above, the SOC of the battery may be constantly maintained at a predetermined level or more in each flight step of the vertical take-off and landing aerial vehicle for urban air mobility, whereby flight of the vertical take-off and landing aerial vehicle may be stably performed, exhaust gas may be reduced through catalyst heating before take-off, and engine self-diagnosis may be performed according to an oxygen sensor diagnosis request.

As is apparent from the foregoing, the present invention may have the following effects.

First, it is possible to constantly maintain the SOC of a battery at a predetermined level or more in each flight step of a vertical take-off and landing aerial vehicle, whereby it is possible to prevent a phenomenon in which the SOC of the battery is insufficient and a phenomenon in which the output of a motor is insufficient, and therefore it is possible to stably perform flight of the vertical take-off and landing aerial vehicle.

Second, it is possible to reduce exhaust gas through catalyst heating before take-off.

Third, it is possible to perform engine self-diagnosis according to an oxygen sensor diagnosis request.

Fourth, it is possible to charge the battery according to driving of an engine and a generator, whereby it is possible to reduce the capacity of the battery, and it is possible to exclude a separate external charger connection part, etc. whereby it is possible to reduce costs.

The effects of the present invention are not limited to those mentioned above, and other unmentioned effects will be clearly understood by an ordinary skilled person from the above description.

It will be apparent to a person of ordinary skill in the art that the present invention described above is not limited to the above embodiments and the accompanying drawings and that various substitutions, modifications, and variations can be made without departing from the technical idea of the present invention.

What is claimed is:

1. A powertrain control method of a vertical take-off and landing aerial vehicle, comprising:

determining, by a controller, a current flight step of the vertical take-off and landing aerial vehicle;

sequentially performing, by the controller, an engine driving mode determination step, an engine driving amount calculation step, a required engine torque determination step, and a required generator torque determination step for the determined flight step in order to drive an engine; and operating, by the controller, a generator according to driving of the engine and charging a battery with power generated by the generator;

wherein the driving of the engine and the generator is controlled based on required power of a motor and a state of charge (SOC) of the battery in the determined flight step of the vertical take-off and landing aerial vehicle such that the SOC of the battery is constantly maintained at a predetermined level or higher; and wherein, when the current flight step is determined to be a cruising step or a take-off preparation step and there is an oxygen sensor diagnosis request signal for engine self-diagnosis, the engine driving mode is determined to be engine passive run, and engine self diagnosis for analyzing a detected signal of an oxygen sensor is performed.

2. The powertrain control method according to claim 1, wherein, when the engine driving mode is determined to be engine part load or engine full load for the determined flight step, target torque of the engine and target RPM of the engine are calculated, and approval of injection of fuel to the engine and an engine torque command are determined, the generator is driven according to driving of the engine and the battery is charged with power generated by the generator.

3. The powertrain control method according to claim 1, wherein, when the current flight step is determined to be the take-off preparation step, the engine driving mode determination step, the engine driving amount calculation step, the required engine torque determination step, and the required generator torque determination step are sequentially performed, and then a step of determining take-off standby or not is performed.

4. The powertrain control method according to claim 3, wherein, when there is a catalyst heating request signal in the engine driving mode determination step, the engine driving mode is determined to be engine idle and a catalyst is heated to a predetermined temperature or greater before take-off.

5. The powertrain control method according to claim 3, wherein, when the SOC of the battery is equal to or less than a reference value of the SOC of the battery, a battery discharge limit is equal to or less than a reference value of the battery discharge limit, or catalyst heating is being continuously performed in the step of determining take-off standby or not, a take-off standby request signal is transmitted from a main controller to a flight controller such that the vertical take-off and landing aerial vehicle is maintained in a take-off standby state.

6. A powertrain control method of a vertical take-off and landing aerial vehicle, comprising:

determining, by a controller, a current flight step of the vertical take-off and landing aerial vehicle;

sequentially performing, by the controller, an engine driving mode determination step, an engine driving amount calculation step, a required engine torque determination step, and a required generator torque determination step for the determined flight step in order to drive an engine; and operating, by the controller, a generator according to driving of the engine and charging a battery with power generated by the generator;

wherein the driving of the engine and the generator is controlled based on required power of a motor and a state of charge (SOC) of the battery in the determined flight step of the vertical take-off and landing aerial vehicle such that the SOC of the battery is constantly maintained at a predetermined level or higher;

wherein, when the current flight step is determined to be a cruising step approaching a destination, the engine driving mode determination step, the engine driving amount calculation step, the required engine torque determination step, and the required generator torque determination step are sequentially performed, and then a step of determining landing standby or not is performed; and wherein, when the SOC of the battery is equal to or less than a reference value of the SOC of the battery, a battery discharge limit is equal to or less than a reference value of the battery discharge limit RPM of the engine is equal to or less than a reference value of the RPM, or no fuel is injected in the step of determining landing standby or not, a landing standby request signal is transmitted from a main controller to a flight controller such that the vertical take off and landing aerial vehicle is maintained in a landing standby state.

* * * * *